United States Patent [19]

Kitsuregawa et al.

[11] Patent Number: 5,396,628
[45] Date of Patent: * Mar. 7, 1995

[54] METHOD OF AND APPARATUS FOR DATA DISTRIBUTION OF PROCESSING LOAD

[75] Inventors: Masaru Kitsuregawa, 17, Maruyama-cho, Nijjuseikigaoka, Matsudo-shi, Chiba-ken; Shinya Fushimi, Kanagawa, both of Japan

[73] Assignees: Mitsubishi Denki Kabushiki Kaisha, Tokyo; Masaru Kitsuregawa, Chiba, both of Japan

[*] Notice: The portion of the term of this patent subsequent to Aug. 17, 2010 has been disclaimed.

[21] Appl. No.: 24,188

[22] Filed: Feb. 26, 1993

[30] Foreign Application Priority Data

Mar. 2, 1992 [JP] Japan .................................. 4-044780

[51] Int. Cl.⁶ .......................................... G06F 13/38
[52] U.S. Cl. .............................. 395/650; 364/DIG. 1; 364/281
[58] Field of Search ......................... 395/650; 364/281

[56] References Cited

U.S. PATENT DOCUMENTS 5,237,683  8/1983  Kitsuregawa et al. ............. 395/650

FOREIGN PATENT DOCUMENTS 0426990  10/1990  European Pat. Off. .
61-224046  2/1987  Japan .

OTHER PUBLICATIONS

23rd Asilomar Conference on Signals, Systems & Computers, Nov. 1989, vol. 2, Pacific Grove, Calif.

*Primary Examiner*—Kevin A. Kriess
*Assistant Examiner*—A. Katbab
*Attorney, Agent, or Firm*—Wolf, Greenfield & Sacks

[57] ABSTRACT

A data distributing method and an apparatus employing such method are disclosed, wherein a memory group stores the cumulative value of weighted values indicating data processing load of each kind of data or work unit outputted from a coupling unit. A control circuit recognizes the kind of data that is inputted to each of two input lines of the coupling units, judges whether or not there is a deviation in distribution of data or work units which are transferred from a first memory group to a second memory group on the basis of the cumulative value stored in the memory groups that correspond to the kinds of data recognized, and changes over connection patterns of switch in the coupling unit so that any deviation is corrected, thereby equally distributing the data processing load of data or work units to the second memory group.

7 Claims, 6 Drawing Sheets

METHOD OF AND APPARATUS FOR DATA DISTRIBUTION OF PROCESSING LOAD

BACKGROUND OF THE INVENTION

The present invention relates to a data distribution method or use in a data distrbution apparatus which is capable of equally distributing the data processing loads of a large amount of data or work units over a group of memories and enabling efficient parallel processing of a large amount of data or work units.

FIG. 4 illustrates the coupling units employed in the data distribution apparatus proposed in Japanese Patent Application No. 185561/90. In FIG. 4, reference numeral 1 denotes a coupling unit, numerals 2 and 3 two data input lines of the coupling unit, numerals 4 and 5 two data output lines of the coupling unit, numeral 6 a switch for switching the data connecting patterns in the coupling unit, numeral 7 a group of counters corresponding to each kind of data or work unit, and numeral 8 the control unit which serves to control the group of counters and switch the data connecting patterns in accordance with the contents of the counter group 7. A first pattern in which the input lines 2 and 3 are connected to the output lines 4 and 5, respectively (hereinafter referred to as "parallel pattern"), and a second pattern in which the input lines 2 and 3 are connected to the output lines 5 and 4, respectively (hereinafter referred to as "cross pattern") are shown. FIG. 5 illustrates two data connection patterns that are realized by the switch 6 in the coupling unit 1. In FIG. 5, the upper pattern corresponds to "parallel pattern" and the lower pattern corresponds to "cross pattern". FIG. 6 illustrates the general constitution of the conventional data distribution apparatus. In FIG. 6, reference numeral 9 denotes a data distribution apparatus, numeral 10 a first memory group and numeral 11 a second memory group.

In the system shown in FIG. 6, coupling units 1 are arranged in a matrix comprising $4 \times 3$ rows. This is because the first memory group 8 comprises 10 memories and it is therefore necessary to provide 4 units (each having two input lines) in each vertical row and $\log_2 8 = 3$ rows in each horizontal row. Generally, it is necessary, in order to distribute data equally by use of a first group of N memories and a second group of N memories, to form a data distributing apparatus comprising a group of coupling units which are arranged in a matrix of $(N/2) \times \log_2 N$ rows. It should be noted that there are various other methods of arranging a network which comprises a plurality of coupling units, and that the technique according to the present invention may be similarly effectively applied to these methods. The details of the coupling unit arrangement shown in FIG. 6 and other coupling unit arrangements are explained in the report of the Electronic Communication Society Proceedings Vol. J86-D, No. 6, p. 1272.

The first memory group is adapted to store at a minimum the data or the work units to be processed. The second memory group is used as a tentative storage area for processing the data or the work units stored in the first memory group. A plurality of coupling units 1 are used for equally distributing in the second memory group 11 the data or work units that are stored in the first memory group 10.

Operation of the data distribution apparatus will now be explained. For the sake of description, it is assumed that the object of distribution is data only, and that data are transferred from the first group 10 of N memories to the second group 11 of N memories after being classified into K different kinds of data. More specifically, each of the data belongs to any of the kinds from 0 to $K-1$. According to a prior art, if the total Nx number of the data for the 4Xth ($X=0, \ldots, K-1$) kind are transferred from the first group 10 of memories to the second group 11 of memories, Nx/N number of data for each memory are transferred to the second group 11 of memories. Thus each Nx/N number of data are transferred to the second memory group and the data for all kinds of the X-th ($X=0, \ldots, K-1$) data are distributed to the second memory whereby data distribution will be completed.

As the data distribution operation is started, data are successively sent from the first group 10 of memories to either of the data input lines 2 or 3 of the coupling units in the first row, which are connected with the respective memories in the first group. Each coupling unit 1 in the first row sets either one of the two connection patterns for the switch 6 shown in FIG. 5, according to the instruction from the control circuit 8, to move the input data in accordance with the switch 6 which has been set and transfer the data to the coupling units in the second row which is connected to the coupling unit 1 concerned, through either of the data output lines 4 or 5, thence repeats this operation. The respective coupling units 1 in the second row and those in the subsequent rows also repeat a similar operation. Data that are output through either of the data output lines 4 or 5 of each coupling unit 1 belonging to the final row are stored separately in the respective corresponding memories in the second memory group 2 while being arranged according to kind.

The control circuit 8 determines the connection patterns for the switch 6 in the following manner. Prior to data distribution, the group 7 of counters for the respective coupling unit 1 are all initialized to zero. The counters in the group 7 are so controlled that when data belonging to X-th ($X=0, \ldots, K-1$) kind are output from the data output line 4, the X-th counter in the counter group 7 is increased by "1". Also, if similar data are output from the data output line 5, the counter group 7 is so controlled by the control circuit 8 that "1" is subtracted from the Xth counter in the counter group 7. More specifically, if the count of the X-th counter in the counter group 7 is positive at a certain point in time, it means that the majority of the data of the X-th kind output from the coupling unit 1 up to that time was delivered through the data output line 4. Similarly, if the count of the counter in the counter group 7 is "0", it means that only half of the number of the data of the X-th kind output from this coupling unit 1 up to that time were delivered through the data output line 4, and the remaining half of the data were delivered through the data output line 5. It is therefore to be noted that as a result, data belonging to the X kind are equally distributed and output as far as this coupling unit 1 is concerned. If the count of the counter in the counter group 7 is negative, it means that the majority of the data was delivered through the data output line 5. In the example shown in FIG. 4, the counts of the counters in the counter group 7 are and "1", "5", "0", and "−2" respectively. This means that "1" indicates that the number of data of the 0-th kind delivered by the data output line 4 is greater than the data delivered by the data output line 5 by one, "5" indicates that the number of data of the first kind delivered by the data output line 4 is greater than the data delivered by the data output line 5 by five, "0" indicates that the number of data of the second kind delivered by the data output line 4 is equal to the data delivered by the data output line 4 and "−2" indicates that the number of data of the third kind delivered by the data output line 5 is greater than the data delivered by the data output line 4 by two.

Thus, it is possible by means of the counter group 7 to control the condition of local distribution of the data delivered through the two output lines 4 and 5 of the coupling unit 1 concerned for each kind of data. It is necessary, in order to realize equal distribution of data for each kind, to output the same number of data for each kind to each of the output lines in the coupling unit, which is equivalent to the fact that the counts of all the counters in the group 7 are all "0" at the time of completion of data distribution.

The control circuit 8 of the respective coupling unit seeks the difference in the counter values corresponding to the kind of incoming data each time data are transmitted to the data input line 2 or the data input line 3. If the counter value is positive or zero, the control unit 8 connects the data input lines 2 or 3 to the data output lines 5 or 4, respectively. If said value is negative, the control circuit connects the data input lines 2 and 3 to the data output lines 4 and 5, respectively, thereby determining the connection patterns for the switch 6. The data which have been sent to the data input lines 2 or 3 are delivered to the data output lines 4 and 5 in accordance with the thus determined connection patterns for the switch 6, and further delivered to the group of coupling units connected to these data output lines.

For example, it is assumed that data which belong to the 0-th kind are input through the data input line 2 and data which belong to the first kind are inputted through the data input line 3, and the counts of the counters corresponding to these kinds are "1" and "5" respectively. This means that the number of data of the 0-th kind input to the coupling unit and output by the data output line 4 up to that time is greater than that of the data output by the data output line 5 by one, and similarly, the number of data of the first kind output by the data output line 4 is greater than the data output by the data output line 5 by five. In this case, since data distribution is deviated to data of the first kind rather than data of 0-th kind, it is advantageous if the data input line 2 is connected to the data output line 4 and the data input line 3 is connected to the data output line 5, so as to reduce such deviation of distribution of data of the first kind. According to the above-described method, the difference between the counts of the two counters is negative since $1-5=-4$, and the connection pattern for this value is selected for the switch 6.

According to the data distribution apparatus of a prior art which is constituted as above described, the number of data or work units may be equally distributed. However, since the processing load of the data or the work units varies depending on their contents, the processing load will not be equal if, in actuality, the data processing is executed by the second group 11 of memories. For example, even if data are distributed equally from the first group 10 of memories to the second group 11 of memories, when the distributed data or work units are processed by the second group 11 of memories, the processing time is determined by completion of processing by the memory in the second memory group 11 which is the most heavily loaded and takes the longest processing time, resulting in extended processing time.

It was also a problem that many of the memories in the second memory group caused the working efficiency to be lowered. Under these circumstances, if a large number of data or work units are to be processed, the processing efficiency is lowered.

SUMMARY OF THE INVENTION

The present invention has been proposed to eliminate the problems pointed out above, and it is an object of the present invention to provide a data distribution method which improves the efficiency of processing a large amount of data by equalizing not the number of data or work units. but the processing load of the data or the work units distributed between the memories in the second memory group 11.

The above-mentioned problems may be solved by the data distribution method of the present invention, which includes a plurality of coupling units which are provided between a first group of memories and a second group of memories and adapted to distribute a plurality of data or work units from the first group of memories to the second group of memories in accordance with a predetermined rule, said data distributing method further including a group of memories 12 adapted to add the weighted values representing the data processing load for each kind of data or work unit to be distributed to said second group of memories and store the cumulative values of said weighted values for each kind of data, and a control means (the control circuit 13) to switch and control the data connecting patterns of said coupling units in accordance with the contents stored in said group of memories, wherein said control means is adapted to detect any deviation in the processing load of the data or the work units distributed to said second group of memories and compensate said deviation by switching the data connecting pattern of said coupling units, thereby so controlling such that the data processing load at the second group of memories may be equalized.

The data distributing method according to the present invention includes a group of memories 12 for each coupling unit 1 whereby the cumulative values of the weighted values of the processing load of the data or the work units outputs from said coupling units are stored for each kind of data. The control circuit 13 for each coupling unit is adapted to detect any deviation in the processing load of the data or the work units transferred from the first group of memories to the second group of memories in accordance with the contents stored in said group of memories, switch the data connection patterns of the coupling units so as to compensate said deviation and so control the distribution of the data or the work units in the second group of memories. Thus, according to this data distribution method, weighted values representing the processing load of the data or the work units are input to the coupling units together with the data or the work units, and the data or the work units are distributed in the coupling units in such a manner that the processing load of the data or the work units may be equalized for each kind of data or work unit by accumulating not the number of data or work units, but the weighted values of the data or the work units.

DETAILED DESCRIPTION OF THE PREFERRED EMBODIMENTS

Figure 1:
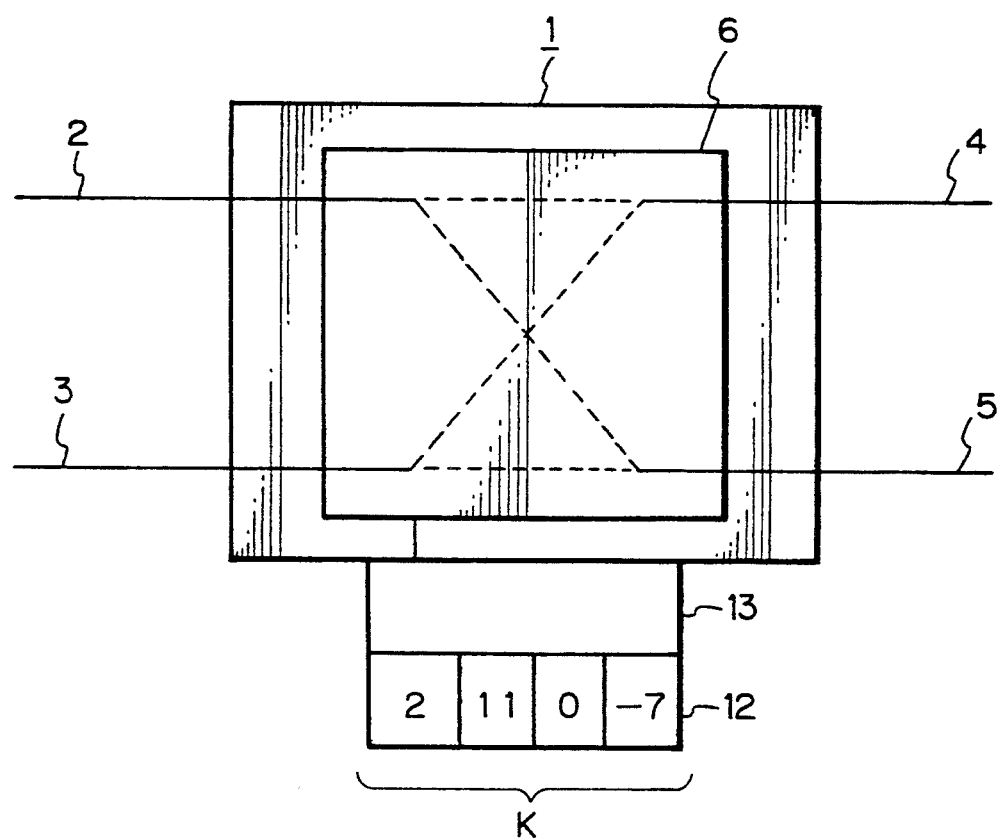
FIG. 1 illustrates the constitution of the coupling units employed in the data distribution apparatus which utilizes the data distribution method according to an embodiment of the present invention.
Figure 2:
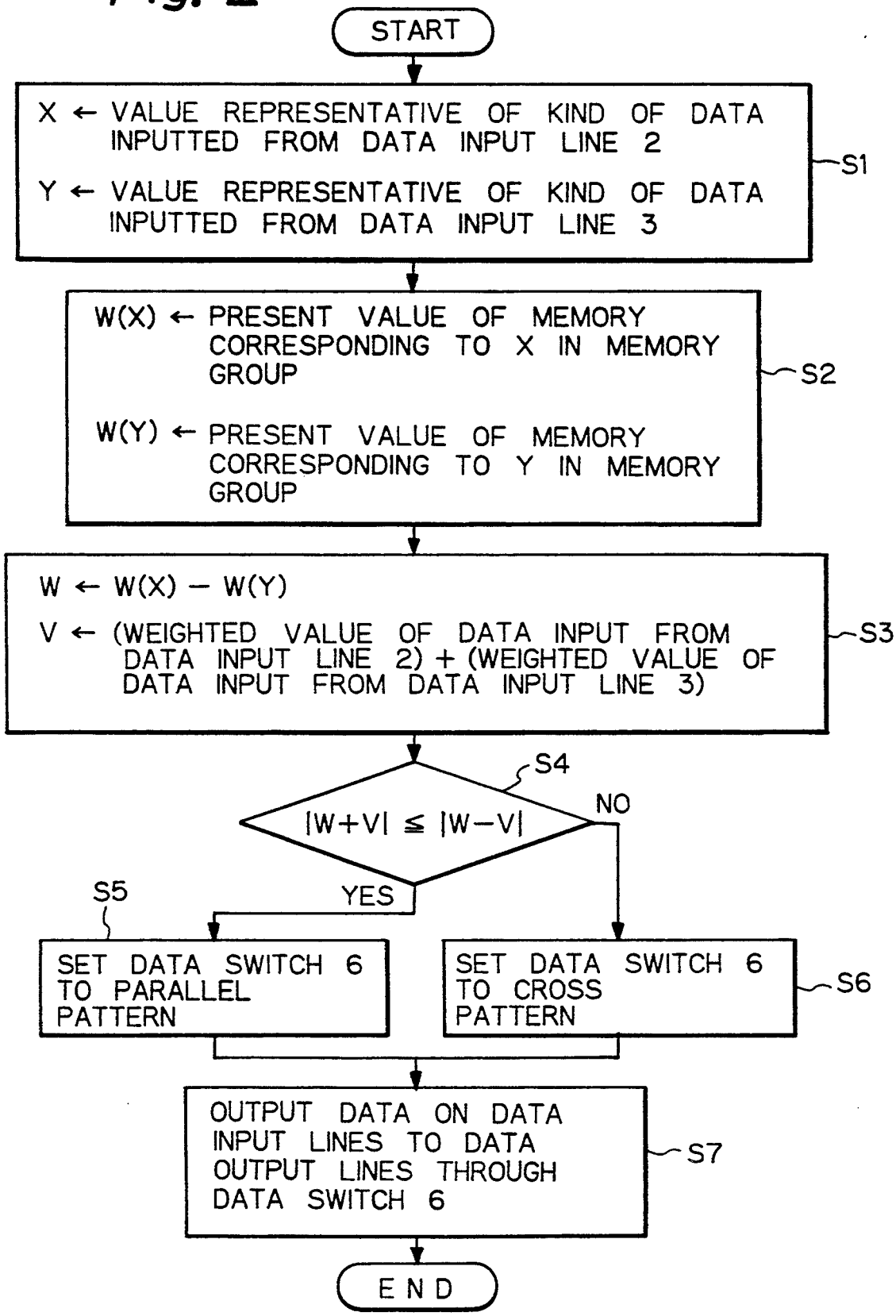
FIG. 2 is a flow chart illustrating the operation of the control circuit shown in FIG. 1.
Figure 3:
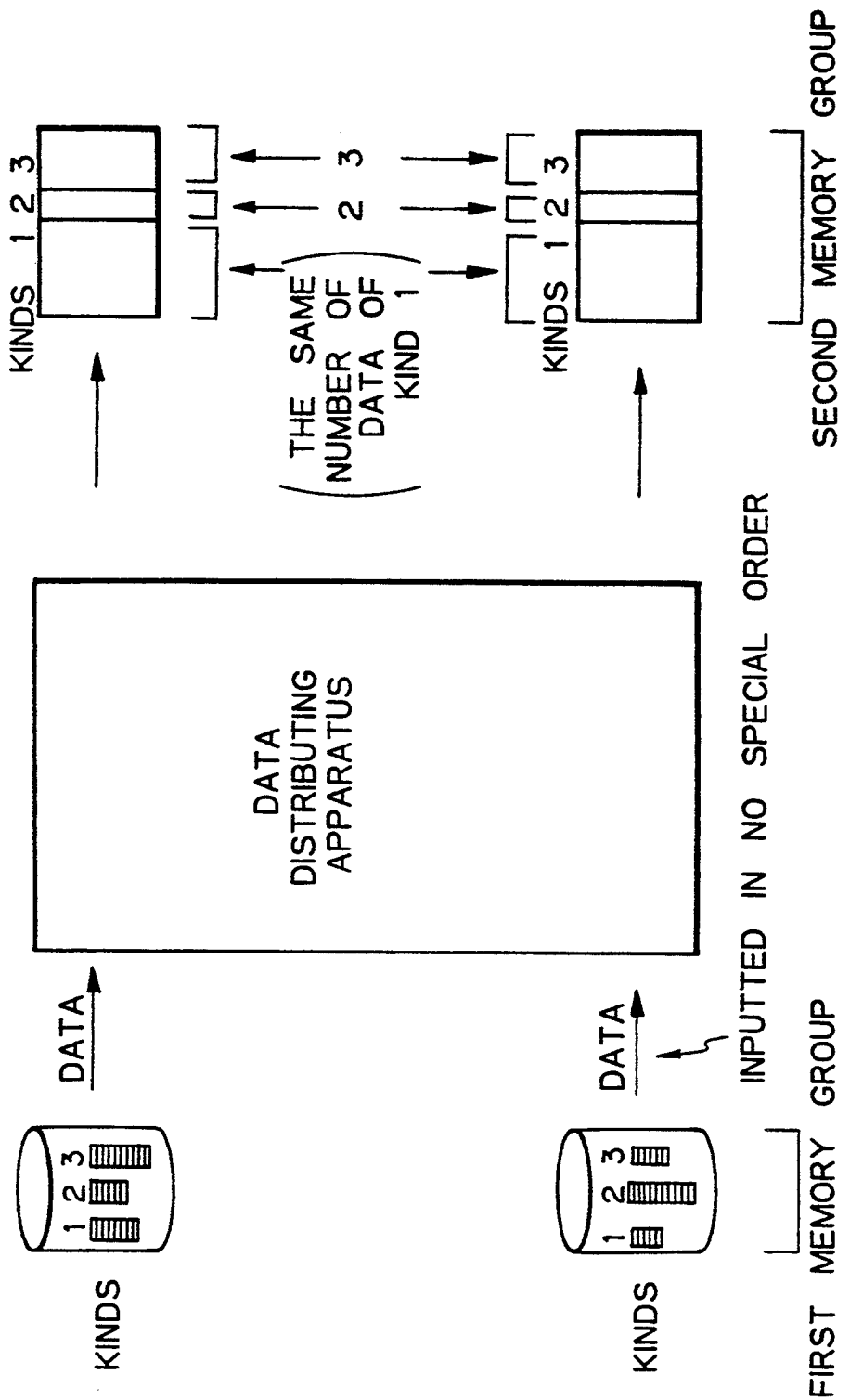
FIG. 3 illustrates the constitution showing the concept of FIG. 1 to explain the difference of the present invention from a prior art.
Figure 4:
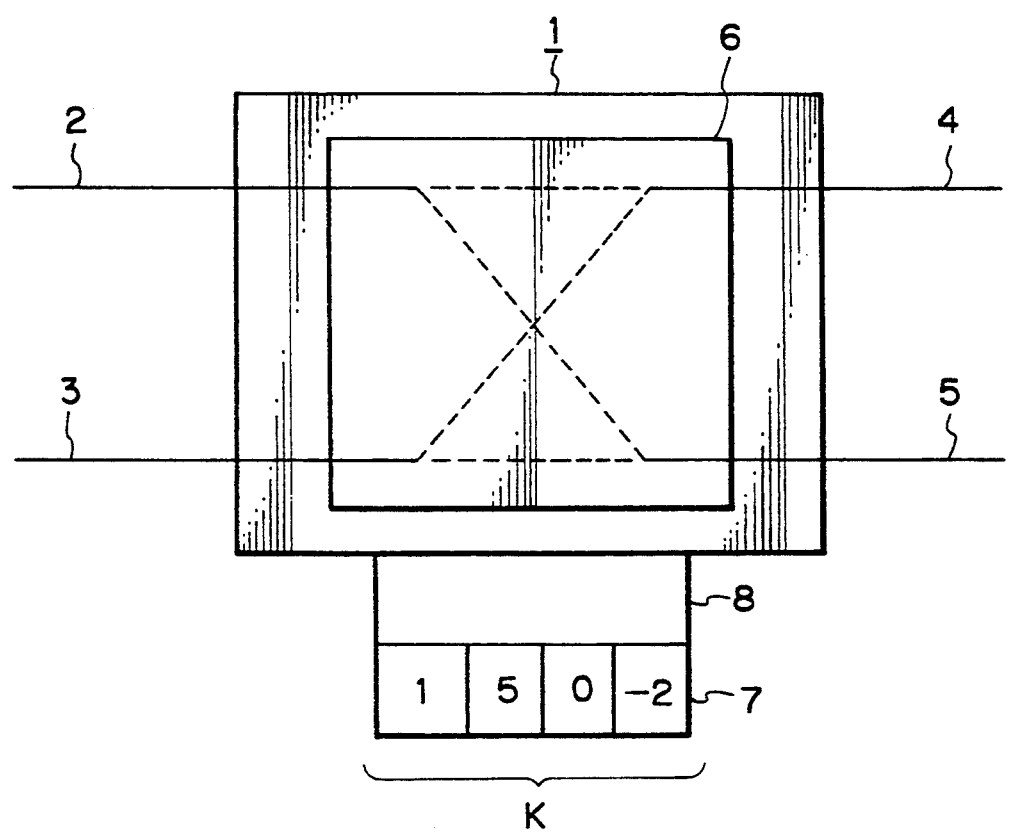
FIG. 4 illustrates the constitution of the coupling units provided in a conventional data distribution apparatus.

An embodiment of the present invention will now be explained by referring to the accompanying drawings. FIG. 1 illustrates a coupling unit to be provided in the data distributing apparatus which employs the data distributing method of the present invention. In FIG. 1, reference numeral 1 denotes a coupling unit for distributing data or work units from a first group of memories 10 to a second group of memories 11, numerals 2 and 3 two data input lines of the coupling unit 1, numerals 4 and 5 two data output lines of the coupling unit, numeral 6 a switch for switching the data connecting patterns in the coupling unit, numeral 12 a group of memories which accumulate weighted values for each kind of data or work unit, and numeral 13 a control circuit which controls said group of memories and changes over the data connecting patterns in accordance with the content in the group of memories 12. FIG. 2 is a flow chart illustrating operation of the control circuit according to this embodiment. It should be noted that the general constitution of the data distributing apparatus in accordance with this embodiment is the same as that shown in FIG. 3 except for the coupling unit, and a description thereof is therefore omitted.

The operation will next be explained. For the sake of explanation, it is assumed that data which have been classified into K number of kinds are transferred from the first group 10 of memories comprising N number of memories to the second group 11 of memories comprising N number of memories. In other words, each of the data belongs to any one of the kinds from 0 to K−1. In a prior art, assuming that the total Nx number of data of K−1th kind are transferred from the first group memory 10 to the second group memory 11, each Nx/N number of data are transferred to each memory. While the prior art was so intended that each Nx/N number of data are transferred to the second memory group 11 and all kinds of X-th (X=0, ..., K−1) data are distributed to the second group memory, according to the present embodiment, assuming that the sum of the weighted value of the processing load of X-th (X=0, ..., K−1) data is Wx, the data are so distributed that the sum of the weighted values of the data distributed to the respective memories of the second group memory 11 for each kind of X will be Wx/N.

Figure 5:
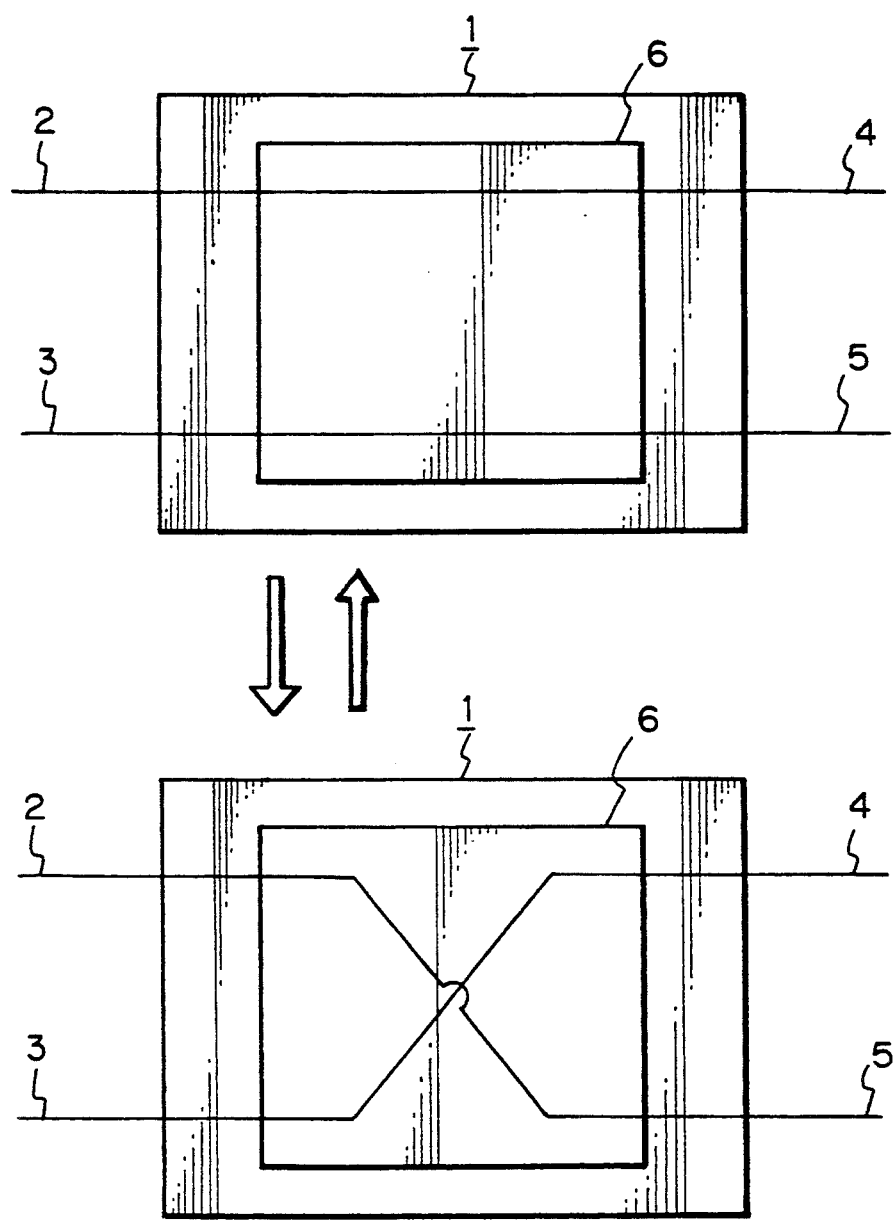
FIG. 5 illustrates the constitution explaining the data connecting patterns in the coupling units shown in FIG. 4.
Figure 6:
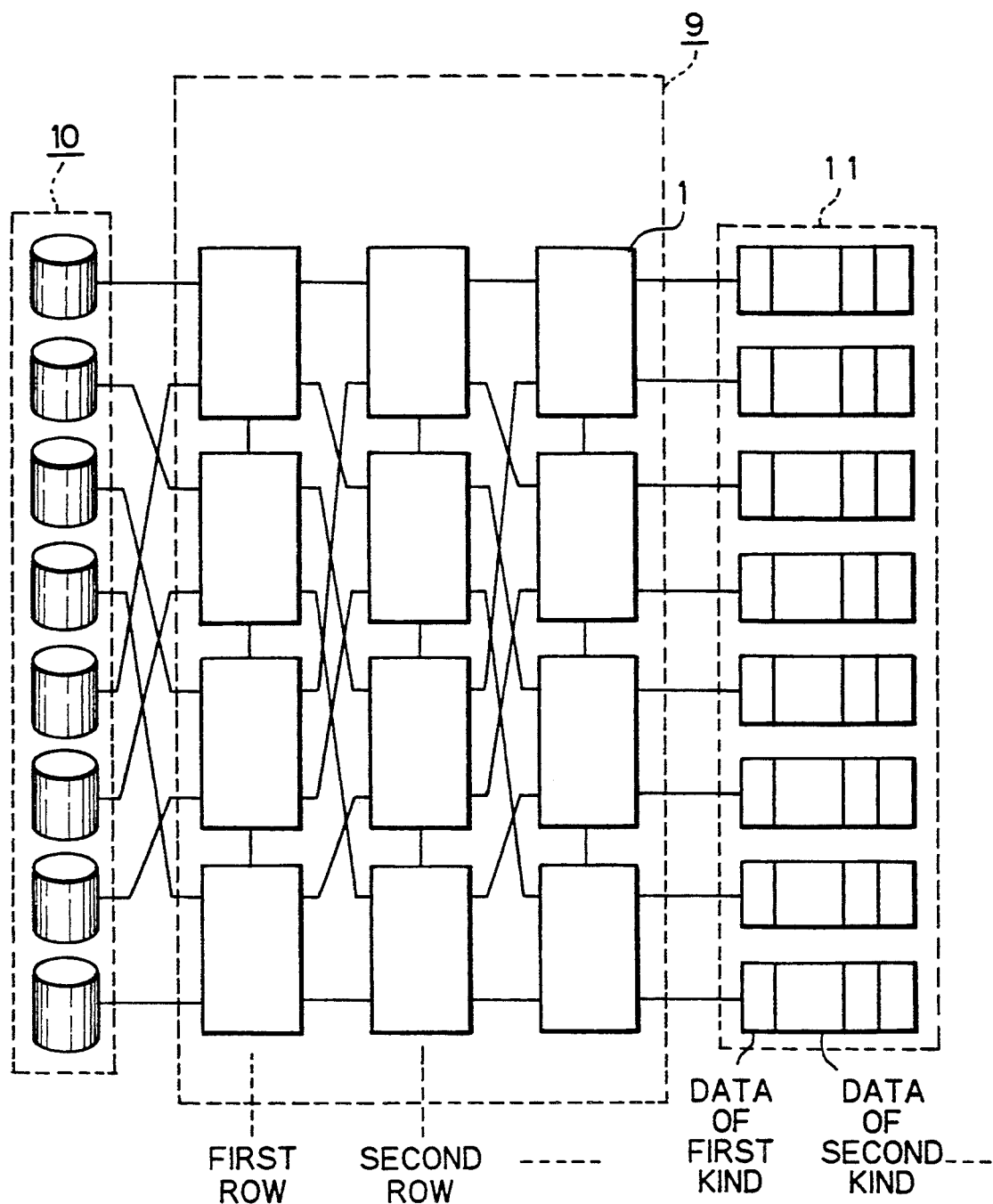
FIG. 6 illustrates the overall constitution of a conventional data distribution apparatus.

As the data distribution operation is commenced, data are successively sent from the first group 10 of memories to either of the data input lines 2 or 3 of the coupling units in the first row, which are connected with the first group memory. Each coupling unit 1 in the first row sets either one of the two patterns for the switch 6 shown in FIG. 5 according to an instruction from the control circuit 13, moves the input data along the set switch 6 and transfers the data to the coupling unit in the second row through the data output lines 4 or 5 which are connected to the coupling unit. This operation is repeated. The coupling units 1 in the second row and those in the subsequent rows repeat a similar operation. The data which have been output from the data output lines 4 or 5 of the respective coupling unit in the final row are separately stored in the respective corresponding memories in the second memory group while being arranged according to kind.

The control circuit 13 determines the connection pattern of the switch 6 in the following manner. Prior to distribution of data, the group of memories 12 for the respective coupling units are all initialized to zero. When the data belonging to X-th (X=0, ..., K−1) kind are output to the group of memories 12 from the data output line 4, the weighted value of the processing load of the relevant data is added to the X-th memory in the group of memories 8. When similar data are output from the data line 5, the control circuit 13 so controls such that the weighted value of the processing load relevant to the concerned data is subtracted from the X-th memory in the group of memories 12. Thus, if the value in the X-th memory in the group of memories 12 is positive at a certain point in time, it means that the majority of the processing load of the data of the X-th kind output from this coupling unit up to that time was delivered from the data output line 4. Similarly, if the count is "zero", the data of X-th kind output from the coupling unit up to that time were delivered through the data output lines 4 or 5 so that the total processing load of the data may be equalized. If the count is negative, it means that more than half of the processing load has been delivered from the data output line 5. In the example shown in FIG. 1, the counts of the group of memories 12 at a certain point in time are "2", "11", "0", "−7" respectively. These counts mean that the number of data of the 0-th kind that were delivered to the data output line 4 is greater than those delivered to the data output line 5 by two, the number of data of the first kind that were delivered to the data output line 4 is greater than those delivered to the data output line 5 by eleven, the number of data of the second kind that were delivered to the data output line 4 is equal to those delivered to the data output line 5, and the number of data of the third kind that were delivered to the data output line 4 is less than those delivered to the data output line 5 by seven.

Thus, it is possible by means of the group of memories 12 to control the condition of local distribution of the data load delivered through two data output lines 4, 5 from the coupling unit 1 for each kind of data. In order to attain equal distribution for each kind of data, it is necessary for the respective coupling units to output to the respective output lines an equal total processing load for each kind of data, which is equivalent to the fact that the counts of all the memories 12 in the respective coupling units are 0 at the time of completion of data distribution.

As to data that is input through the data input line 2 or 3, when the definition of kinds of data can be readily made, it is possible to obtain the kind of data to which the input data belongs from the data itself. For example, if eight different kinds of data are defined by using three low-order bits in the bit expression of data as a kind identifier, the coupling unit itself can identify the kind of data by extracting three low-order bits. When the definition of kinds of data is complicated, it is possible to identify the kind of each piece of data, for example, by arithmetically obtaining the kind of data immediately before the data is delivered from the first memory group 10, adding such information to the top of the data, and referring to the top of the data in the coupling unit 1.

The value indicating the processing load of each data is predetermined by an estimation method which does not relate to this invention and added to corresponding data as a field for carrying the estimated value as a code and so on. Thus the value in the field may be read and manipulated by the control circuit 13.

The operation of the control circuit 13 will be further explained below with reference to the flow chart in FIG. 2. Each time when data are delivered to the data input lines 2 and 3, the control circuit 13 of the respective coupling units calculates the values in the memories corresponding to the kind of data input to the data input line 3 subtracted from the values in the memories corresponding to the kind of data input to the data input line 2 (Steps S1-S3), and further seeks the sum of the weighted values associated with the data input to the data input lines 2 and 3. These values are here assumed to be W, V respectively. If $|W+V| \leq |W-V|$, the data input lines 2 and 3 are respectively connected to the data output lines 4 and 5 (YES in Step S4 and Step S5). If $|W+V| > |W-V|$, the data input lines 2 and 3 are respectively connected to the data output lines S and 4 (NO in Step S4 and Step S6). Thus, the connecting pattern of the switch 6 is determined (Step 7). $|S|$ designates the absolute value of the numeral S. In this way, data that have been delivered by the data input lines 2 and 3 are sent to the data output lines 4 and 5 in accordance with the connection pattern of the switch 6 determined in the above-described manner and to the group of coupling units connected to the data output line.

For example, at a certain point in time, assume that data belonging to the 0-th kind have been input from the data input line 2, and data belonging to the first kind have been input from the data input line 3, and that the values in the memories belonging to these kinds are "2" and "11" respectively. Also assume that the weighted values of the processing load relating to these data are "1" and "5" respectively.

This means that the load of the data of 0-th kind input by that point in time which were output by the data output line 4 is greater than those output by the data output line 5 by two. Similarly, it means that the load of the first kind of data which were output by the data output line 4 is greater than those output by the data output line 5 by eleven. In this case, since distribution of data of first kind is more deviated, it is advantageous if the data are transferred so as to reduce the deviation of distribution of the data of the first kind. If the data input line 2 is connected to the data output line 4 and the data input line 3 is connected to the data output line 5, the corresponding values in the group 12 of memories are 6 for data of 0-th kind and "6" for data of the first kind, resulting in less deviation of the data distribution. On the other hand, if the data input line 2 is connected to the data output line 5 and the data input line 3 is connected to the data output line 4, the corresponding values in the group 12 of memories are "1" for data of 0-th kind and "16" for data of the first kind, resulting in greater deviation of the data distribution. According to the above-described operation, the value of W, which is obtained by subtracting the value of the data input line 3 from the corresponding value in the group 12 of memories of the data input to the data input line 2, is $W = 2 - 11 = -9$, while the sum of V, which is obtained by adding the weighted value of the data input to the data input line 2 to those input to the data input line 3, is $V = 1 + 5 = 6$. In this case, $|W+V| = |-9+6| = 3$ and $|W-V| = |-9-6| = 15$ and since $|W+V| < |W-V|$, the data input line 2 is connected to the data output line 4 and the data input line 3 is connected to the data output line 5 as the corresponding connecting patterns, whereby connecting patterns reducing deviation of the data distribution may be selected.

It is to be noted that, according to the embodiment as above described, the values W obtained by subtracting the values in the memories corresponding to the kind of data input to the data input line 3 from the values in the memories corresponding to the kind of data input to the data input line 2, and the sum V of the weighted values associated with the data input to the data input lines 2 and 3, are searched at the time of connection according to the connecting patterns, and the connecting patterns are determined by executing a simple calculation. Alternatively, a further mathematically equivalent calculation may be executed for this purpose.

As explained above, according to the present invention, since the data or the work units are equally distributed at the second group of memories as the distribution destination in terms of the processing loads of the data as the object of the distribution according to weighted values relative to the data or the work units, the processing time of the data or the work units distributed to the second group of memories after such distribution of the data or the work units may be equalized, and as a consequence, the processing time as a whole of the second group of memories may be improved and the operational efficiency of the second group of memories may be enhanced. Furthermore, repetition of data distribution and data processing enables a large amount of data to be executed and the efficiency in data processing to be enhanced.

What is claimed is:

1. A apparatus for distributing processing load having a plurality of coupling units which are provided between a first group of devices and a second group of devices to distribute pieces of information of a plurality of different kinds received from said first group of devices to said second group of devices so that the processing load for each kind of information in said second group of devices is substantially equalized, wherein the processing load of at least some pieces of information of one kind is different from the processing load of other pieces of information of the same kind, wherein at least one of said coupling units comprises:
   a data switch having a plurality of data input lines for receiving a plurality of pieces of information and a plurality of data output lines for outputting a plurality of pieces of information;
   memory means for accumulating and storing a cumulative of information outputted from said coupling unit; and value for the processing load of the pieces of information of each kind of information outputted from said coupling unit; and
   a control circuit for detecting a deviation of the distribution of processing load of information switched information on the basis of the cumulative values stored in said memory means, and for changing a data connection pattern in said coupling unit to minimize the deviation of the distribution.

2. The apparatus of claim 1, wherein all of said coupling units include said data switch, said memory means, and said control circuit.

3. An apparatus for distributing processing load having a plurality of coupling units which are provided between a first group of devices and a second group of devices, to distribute data units from said first group of devices to said second group of devices according to a predetermined rule, wherein each of said coupling units has a plurality of accumulators respectively corresponding to a plurality of different kinds of data units, and a control circuit which controls said accumulators and changes data connection patterns on the basis of the contents of said accumulators, each of said accumulators accumulating and storing a cumulative value for a processing load of each kind of data unit outputted from said coupling unit, said control circuit being arranged to judge whether or not there is a deviation in the distribution of the processing load of data units transferred from said first device group to said second device group on the basis of the contents of said accumulators, and to change the data connection patterns in said coupling unit so that any deviation is corrected, and to thereby distribute data units to said second group of devices, the processing load of some data of one kind of data unit being different from other data of the same one kind of data unit.

4. In an apparatus for distributing processing load having a plurality of coupling units which are provided between a first group of devices and a second group of devices, each coupling unit having a data switch which has two data input lines for receiving two pieces of information and two data output lines for outputting two pieces of information, a processing load for each piece of information being determined, a method for distributing to said second group of devices the processing load of each kind of a plurality of pieces of information received from said first group of devices, said method comprising the steps of:

recognizing the kinds of said two pieces of information;

accumulating and storing the cumulative values of the processing load for each of the pieces of information outputted from said output lines, respectively, for each kind of information; and changing a connection pattern in said data switch based on the values of the processing load for each of the said two pieces of information and said cumulative values.

5. The method of claim 4, wherein, prior to said changing step, the method further comprises the steps of:

calculating a difference W between the stored cumulative values concerning said two pieces of information received; and calculating the sum V of processing load concerning said two pieces of information received.

6. A processing load distributing method according to claim 5, wherein said step of changing over connnection patterns in said data switch on the basis of said values effects change-over control such that, if $|W+V| > |W-V|$, said first input line is connected to said second output line and said second input line is connected to said first output line, whereas, if $|W+V| \geq |W-V|$, said first input line is connected to said first output line and, at the same time, said second input line is connected to said second output line.

7. A processing load distributing method according to claim 6, wherein said step of calculating the difference between the stored values concerning said two pieces of information includes subtracting the value stored in the accumulator corresponding to the kind of information piece inputted to said second input line from the value stored in the accumulator corresponding to the kind of information piece inputted to said first input line.

* * * * *